United States Patent [19]
Ide

[11] Patent Number: 4,738,453
[45] Date of Patent: Apr. 19, 1988

[54] HYDRODYNAMIC FACE SEAL WITH LIFT PADS

[76] Inventor: Russell D. Ide, P.O. Box 744, Coventry, R.I. 02816

[21] Appl. No.: 86,485

[22] Filed: Aug. 17, 1987

[51] Int. Cl.$^4$ .............................................. F16J 15/38
[52] U.S. Cl. ...................... 277/81 R; 277/82; 277/87; 277/93 SD; 277/96.1
[58] Field of Search ............ 277/81 R, 82, 85, 87, 277/93 R, 93 SD, 96, 96.1

[56] References Cited

U.S. PATENT DOCUMENTS

| | | | |
|---|---|---|---|
| 1,940,779 | 12/1933 | Williams | 277/81 X |
| 2,586,739 | 2/1952 | Summers | 277/93 X |
| 2,888,281 | 5/1959 | Ratti | 277/81 R X |
| 3,169,024 | 2/1965 | Johnson et al. | 277/82 X |
| 3,559,725 | 2/1971 | Fucinari et al. | 277/81 R X |

FOREIGN PATENT DOCUMENTS 129988  11/1948  Australia ............................ 277/87

*Primary Examiner*—Robert S. Ward
*Attorney, Agent, or Firm*—Barlow & Barlow, Ltd.

[57] ABSTRACT

An end face seal assembly having a seat and a nosepiece rotating relative thereto in which the nosepiece is fitted with a plurality of recesses that carry stool-like pads therein that operate as lift pads. A fluid dam is provided in association with the nose piece adjacent the lift pads. Essentially the lift pads have leg ligaments that permit the pads to rock under the action of pressure and friction to develop a wedge-like lift between the nosepiece and the seat. The ligaments may also be made flexible in a third direction to allow the pads to be equally loaded and be capable of adjusting for shaft misalignment.

5 Claims, 1 Drawing Sheet

HYDRODYNAMIC FACE SEAL WITH LIFT PADS

BACKGROUND OF THE INVENTION

This invention relates to a radial face seal for effecting a seal between relatively rotatable members such as a shaft and a housing which will control the leakage of the fluid from one region of high pressure to a second region of lower pressure. Radial face seals are well known in the art and are essentially formed with two face elements. One of the elements is fixed so that no movement occurs axially relative to the shaft, and this is referred to as a fixed seat. The other element is movable axially along the shaft and is sometimes referred to as a floating element or, in this particular case, to a nose piece. The elements are located in opposed relationship to each other and are arranged so that, in response to fluid pressure, spring pressure, or both, a sealing relationship will be obtained between them to prevent leakage out along the shaft. It has been shown that a mechanical seal is best obtained when the elements are not in direct physical contact with each other but rather when a thin lubricating fluid film is provided between their opposed face surfaces. This fluid film prevents or reduces wear due to direct mechanical contact and avoids the possiblity of mechanical damage or failure. However, the thickness of the fluid film must not be too large to cause excessive leakage and thus, the thickness of the film is controlled by the precise geometry of the face surfaces. In one of the popular arrangements, a lift pad is provided which consists of shallow recesses in the face of the seal and the dimensions of these recesses are critical and difficult to manufacture because of the tight tolerances that are required. Also, any contaminant in the fluid has a significant detrimental effect on the performance of the seal. Accordingly, the hydrodynamic performance range is limited because of the fixed geometry in this structure.

There remains a need therefore in the art to have a controllable mechanical seal where the thickness of the lubricating fluid film can be maintained at a practical thickness and one in which the manufacturing tolerances are reduced. It is further desirable to have a seal arrangement where contaminants are less likely to impact upon the performance of the seal, and, one in which the seal can self adjust for any shaft misalignment. Further, it is desirable to have a seal which will operate over a broader range and reduce any ultimate seal wear by obtaining an optimum film thickness over a wide range of operating conditions.

SUMMARY OF THE INVENTION

A controllable mechanical seal is disclosed for a machine that has a housing and a shaft that is rotatable relative to the housing. The seal includes a stationary cylindrical seat member and a rotatable cylindrical nose piece. The nose piece is fitted with a plurality of lift pads that are held by the nose piece and the nose piece is also fitted with a fluid dam which defines a radial face surface. One or the other of the parts, either the seat, that is, or the nose piece will be rotatable with the shaft and suitable means will bias one element toward the other. The lift pads are particularly formed as stool like units, having flexible leg ligaments that extend at an angle to the pad face, so that the pad face may move in up to three degrees of freedom to form a fluid film between the pad face and the seat member to adjust for shaft misalignment and to provide equal loading among the lift pads. Equal loading among pads in the longitudinal shaft axis direction is provided by dog leg type bends in the ligament construction.

DESCRIPTION OF THE PREFERRED EMBODIMENT

Figure 1:
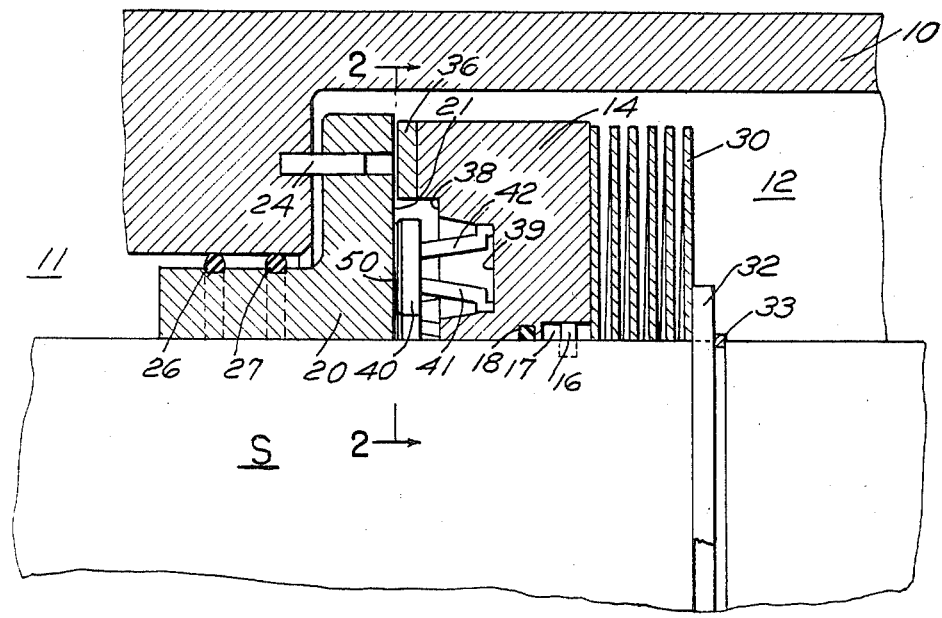
FIG. 1 is a partial sectional view illustrating a preferred embodiment of the seal according to the invention.

The structure showin in FIG. 1 includes a housing 10 having an aperture therethru thru which passes a rotatable shaft S. The seal assembly is intended to restrict leakage of fluid contained in the first high pressure region 11 to a second low pressure region 12. A nose piece 14 is mounted on the shaft 12 to rotate with it by means of a pin drive 16 operating within a key way 17 and there is also a flexible seal in the form of an O-ring 18 that is compressed in a groove in the nose piece 14 so as to restrict the leakage of fluid between the shaft S and the nose pice 14.

The housing 10 is illustrated as having a stepped configuration and has an annular seat 20 that has a face 21, the seat being of stationary to the housing by means of a pin 24, a portion of the seat being sealed to the housing by means of a pair of O-ring seals 26, 27. The nose piece 14 and the seat are relatively rotatable and the nose piece is axially movable on the shaft and relative to the stationary cylindrical seat 20. Inasmuch as the stationary cylindrical seat is somewhat loaded by the high pressure region 11, the nose piece 14 is backed up by a helical spring 30 which is retained in position on the shaft as by means of a collar 32 and a retaining ring 33.

The nose piece 14 is provided with a fluid dam 36 and radially inward of the fluid dam is an annular recess 38 which has a plurality of pockets such as the pocket 39 into which is received lift pads 40. Each of the lift pads 40 is of generally stool like configuration which has legs or ligaments 41, 42, for example, whose sectionaly modulus is small in up to three directions as generally designated by arrows 48. Thus, the preferable construction of each of the ligaments is one in which the cross section is designed so that the legs are flexible in the desired direction of motion and this can be easily designed when the main component of sectional modulus for a rectangular section to be defined by the formula: $Z = I/c = BH^2/6$ (in English units) where B is the base and H is the height.

Figure 3:
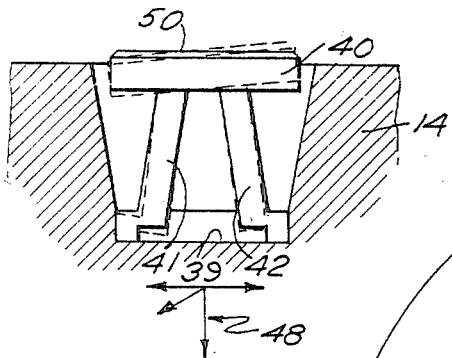
FIG. 3 is a sectional view on a larger scale taken on lines 3—3 of FIG. 2.
Figure 2:
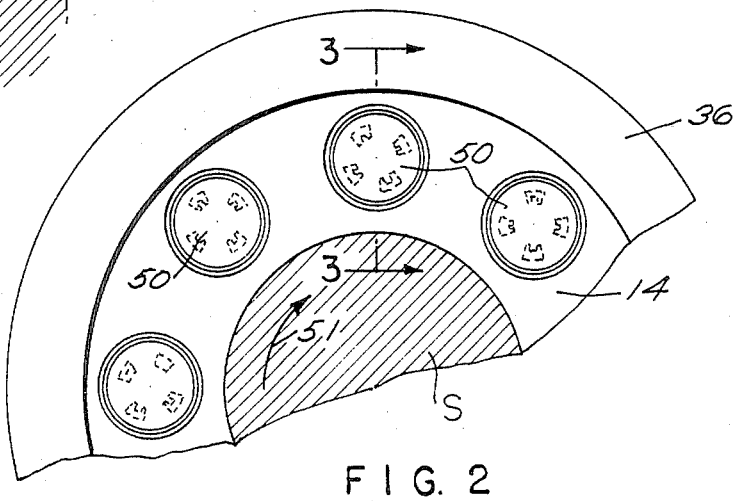
FIG. 2 is a sectional view taken on lines 2—2 of FIG. 1.

In essence, the pads 40 operate so that the friction forces which are developed will tend to rock the pad so that the leading edge of the face 50 will move away from the stationary seat 20 if the shaft axis rotating in the direction of the arrow 51 as seen in FIG. 2. This then will develop a wedge of fluid between the stationary cylindrical seat 20 and the pad face 50 of the pad 40. Also since the legs are also flexible in the other two directions as more clearly shown in FIG. 3, the pads may also move to compensate for shaft misalignment and unequal loading among pads. The dotted lines in FIG. 3 show the loaded or deflected pad shape.

Figure 4:
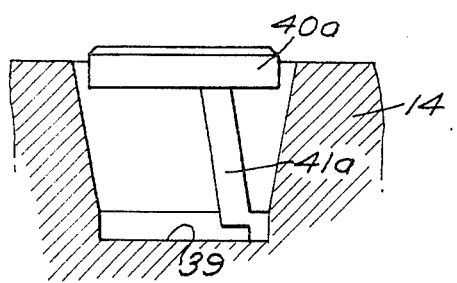
FIG. 4 is a modified form also on a larger scale showing a single ligament configuration for the lift pad.

In some cases under low loading, it may be necessary to reduce ligament support to one leg 41a to increase pad deflection. This structure is shown in FIG. 4 where the pad 40a has the ligament at an angle and offset from the centerline. Since the supporting ligament structure is non-symetrical about the pad centerline or biased in one direction, the bearing is unidirectional.

I claim:

1. An end face seal assembly comprising:
    a stationary cylindrical seat having a first radial surface;
    a rotary cylindrical nosepiece;
    a plurality of lift pads held by said nosepiece, said pads having face surfaces;
    a fluid dam held by said nosepiece, said dam defining a radial face surface;
    means exerting a force against the nosepiece to urge the nosepiece toward the seat;
    said first radial surface and said dam radial face surface defining a gap within which is a thin lubricating film of fluid;
    said lift pads having a stool-like configuration with at least one leg like ligament that extends at an angle to the pad face and whose sectional modulus is small in the rotary circular direction;
    said pad rocking under the action of pressure and friction to develop a wedge lift of the nosepiece and thereby control the leakage of fluid.

2. An end face seal assembly as in claim 1 wherein the lift pad ligaments are flexible in a second direction to adjust for shaft misalignment.

3. An end face seal assembly as in claim 1 wherein each leg like ligament is formed with a dog leg portion to permit movement of the pad in three directions.

4. An end face seal assembly as in claim 1 wherein each leg like ligament is formed about the pad in a symmetrical fashion.

5. An end face seal assembly as in claim 1 wherein each leg like ligament is formed about the pad in a non-symmetrical fashion to provide a unidirectional seal assembly.

* * * * *